US011421691B2

United States Patent
Schnurr et al.

(10) Patent No.: US 11,421,691 B2
(45) Date of Patent: Aug. 23, 2022

(54) MOTOR VEHICLE VACUUM PUMP ARRANGEMENT

(71) Applicant: PIERBURG PUMP TECHNOLOGY GMBH, Neuss (DE)

(72) Inventors: Steffen Schnurr, Essen (DE); Nabil Salim Al-Hasan, Korschenbroich (DE); Stanislaus Russ, Moenchengladbach (DE); Tobias Gruene, Arnsberg (DE)

(73) Assignee: PIERBURG PUMP TECHNOLOGY GMBH, Neuss (DE)

( * ) Notice: Subject to any disclaimer, the term of this patent is extended or adjusted under 35 U.S.C. 154(b) by 319 days.

(21) Appl. No.: 16/638,756

(22) PCT Filed: Aug. 17, 2017

(86) PCT No.: PCT/EP2017/070856
§ 371 (c)(1),
(2) Date: Feb. 13, 2020

(87) PCT Pub. No.: WO2019/034256
PCT Pub. Date: Feb. 21, 2019

(65) Prior Publication Data
US 2020/0332799 A1    Oct. 22, 2020

(51) Int. Cl.
*F04C 29/06* (2006.01)
*B60T 17/02* (2006.01)
(Continued)

(52) U.S. Cl.
CPC ............ *F04C 29/068* (2013.01); *B60T 17/02* (2013.01); *F04B 39/0027* (2013.01);
(Continued)

(58) Field of Classification Search
CPC .............. F04B 39/0027; F04B 39/0055; F04B 39/0061; F04B 2205/13
See application file for complete search history.

(56) References Cited

U.S. PATENT DOCUMENTS 5,567,127 A * 10/1996 Wentz ................... F04D 29/663
417/423.9
6,176,688 B1 * 1/2001 Collings ............. F04B 39/0061
417/312
(Continued)

FOREIGN PATENT DOCUMENTS

CN    102971538 A    3/2013
CN    103790828 A    5/2014
(Continued)

*Primary Examiner* — Patrick Hamo
(74) *Attorney, Agent, or Firm* — Norman B. Thot

(57) ABSTRACT

An electrical motor vehicle vacuum pump arrangement includes a housing assembly which includes an inlet opening arrangement having an inlet opening, an outlet opening arrangement having an outlet opening and an outlet channel, a pump unit having a pump rotor housing with an inlet-side end wall, an outlet side end wall, and a pump rotor housing part arranged therebetween, a drive motor having a motor rotor and a motor stator, sound absorption elements, and a sealing connected to the pump rotor chamber and directed towards the outlet opening. The outlet opening arrangement is connected to one of the sound absorption elements. The outlet channel of the outlet opening arrangement is closed relative to the drive motor and the pump unit. The outlet channel of the outlet opening arrangement, when viewed in a direction of the outlet opening, comprises at least one abrupt change in cross-section.

11 Claims, 2 Drawing Sheets

(51) Int. Cl.
*F04C 25/02* (2006.01)
*F04C 27/00* (2006.01)
*F04C 29/12* (2006.01)
*F04B 39/00* (2006.01)

(52) U.S. Cl.
CPC ...... *F04B 39/0055* (2013.01); *F04B 39/0061* (2013.01); *F04C 25/02* (2013.01); *F04C 27/005* (2013.01); *F04C 29/12* (2013.01); *F04B 2205/13* (2013.01); *F04C 2240/30* (2013.01); *F04C 2240/40* (2013.01); *F04C 2250/102* (2013.01)

(56) References Cited

U.S. PATENT DOCUMENTS

| | | | | |
|---|---|---|---|---|
| 6,312,232 B1 * | 11/2001 | Mori | ................... | B60H 1/00571 |
| | | | | 181/403 |
| 6,402,483 B1 * | 6/2002 | Kawamura | ......... | F04B 27/1081 |
| | | | | 417/269 |
| 6,547,032 B2 * | 4/2003 | Yoon | ................... | F04B 39/0061 |
| | | | | 181/207 |
| 7,153,107 B1 * | 12/2006 | Maddox, Jr. | ........ | F04B 39/0055 |
| | | | | 181/403 |
| 7,181,926 B2 * | 2/2007 | Bhatia | ..................... | F25B 43/02 |
| | | | | 181/403 |
| 8,057,194 B2 * | 11/2011 | Stover | ................... | F04C 29/065 |
| | | | | 181/403 |
| 8,118,563 B2 * | 2/2012 | Chen | ..................... | F04C 29/028 |
| | | | | 417/3 |
| 2013/0101412 A1 | 4/2013 | Mitsuhashi et al. | | |
| 2014/0119957 A1 * | 5/2014 | Yamanaka | .............. | F04C 25/02 |
| | | | | 417/312 |

FOREIGN PATENT DOCUMENTS

| | | |
|---|---|---|
| CN | 206035815 U | 3/2017 |
| DE | 10 2010 041 925 A1 | 4/2012 |
| DE | 10 2013 221 730 A1 | 4/2014 |
| EP | 2 554 848 A2 | 2/2013 |
| EP | 2 568 180 A1 | 3/2013 |
| JP | 2013-528741 A | 7/2013 |
| WO | WO 2015/060030 A1 | 4/2015 |

* cited by examiner

MOTOR VEHICLE VACUUM PUMP ARRANGEMENT

CROSS REFERENCE TO PRIOR APPLICATIONS

This application is a U.S. National Phase application under 35 U.S.C. § 371 of International Application No. PCT/EP2017/070856, filed on Aug. 17, 2017. The International Application was published in German on Feb. 21, 2019 as WO 2019/034256 A1 under PCT Article 21(2).

FIELD

The present invention relates to an electrical motor vehicle vacuum pump arrangement comprising a housing assembly which has an inlet opening arrangement with an inlet opening and an outlet opening arrangement with an outlet opening, and which has a pump unit and a drive motor, wherein the pump unit has a pump rotor housing consisting of an inlet-side end wall and an outlet-side end wall and a pump rotor housing part arranged therebetween which enclose a pump rotor chamber in which a pump rotor is provided, wherein the drive motor has a motor rotor and a motor stator, wherein at least one sound absorption element is provided for noise reduction, wherein the outlet opening arrangement is connected to a sound absorption element, and wherein a sealing is provided connected to the pump rotor chamber and directed towards the outlet opening.

BACKGROUND

DE 10 2010 041 925 A1 describes a generic vacuum pump. In a motor vehicle, such an electrically driven motor vehicle vacuum pump generates, for example, independent of the operating state of an internal combustion engine, a negative pressure of 100 millibar absolute, which is required to operate a pneumatic braking power booster and/or other pneumatically operated accessories. In the case of a cutoff, air will flow from the environment into the pump through the outlet opening due to the internal pressure still prevailing in the pump rotor chamber. A labyrinth-like area intended as a sealing is provided in an outlet opening of the pump rotor housing part to prevent liquid or dirt particles from being taken into the pump rotor chamber, which area is configured to prevent liquid or dirt particles from flowing back. Measures for sound absorption and/or sound insulation have also been taken in the generic pump. The provided sealing in particular contributes to a complex manufacture of the vacuum pump. In the case of pumps of several 100 W, the measures for sound absorption or sound insulation are also not sufficient.

SUMMARY

An aspect of the present invention is to further develop a generic electrical motor vehicle vacuum pump arrangement so that the aforementioned drawbacks are eliminated in a simple and inexpensive manner.

In an embodiment, the present invention provides an electrical motor vehicle vacuum pump arrangement which includes a housing assembly. The housing assembly includes an inlet opening arrangement comprising an inlet opening, an outlet opening arrangement comprising an outlet opening and an outlet channel, a pump unit comprising a pump rotor housing which comprises an inlet-side end wall, an outlet-side end wall, and a pump rotor housing part which is arranged between the inlet-side end wall and the outlet-side end wall, the pump rotor housing part being configured to enclose a pump rotor chamber in which a pump rotor is arranged, a drive motor comprising a motor rotor and a motor stator, at least one sound absorption element which is configured to provide for a noise reduction, and a sealing which is connected to the pump rotor chamber and which is directed towards the outlet opening. The outlet opening arrangement is connected to one of the at least one sound absorption element. The outlet channel of the outlet opening arrangement is closed relative to the drive motor and the pump unit. The outlet channel of the outlet opening arrangement, when viewed in a direction of the outlet opening, comprises at least one abrupt change in cross-section which is designed as the sealing with an $A_2/A_1$ of $\geq 3$, where $A_2$ is a cross-sectional area of a first sub-region behind the at least one abrupt change in cross-section, and $A_1$ is a cross-sectional area of a second sub-region before the at least one abrupt change in cross-section.

BRIEF DESCRIPTION OF THE DRAWINGS

The present invention is described in greater detail below on the basis of embodiments and of the drawings in which.

DETAILED DESCRIPTION

Figure 1:
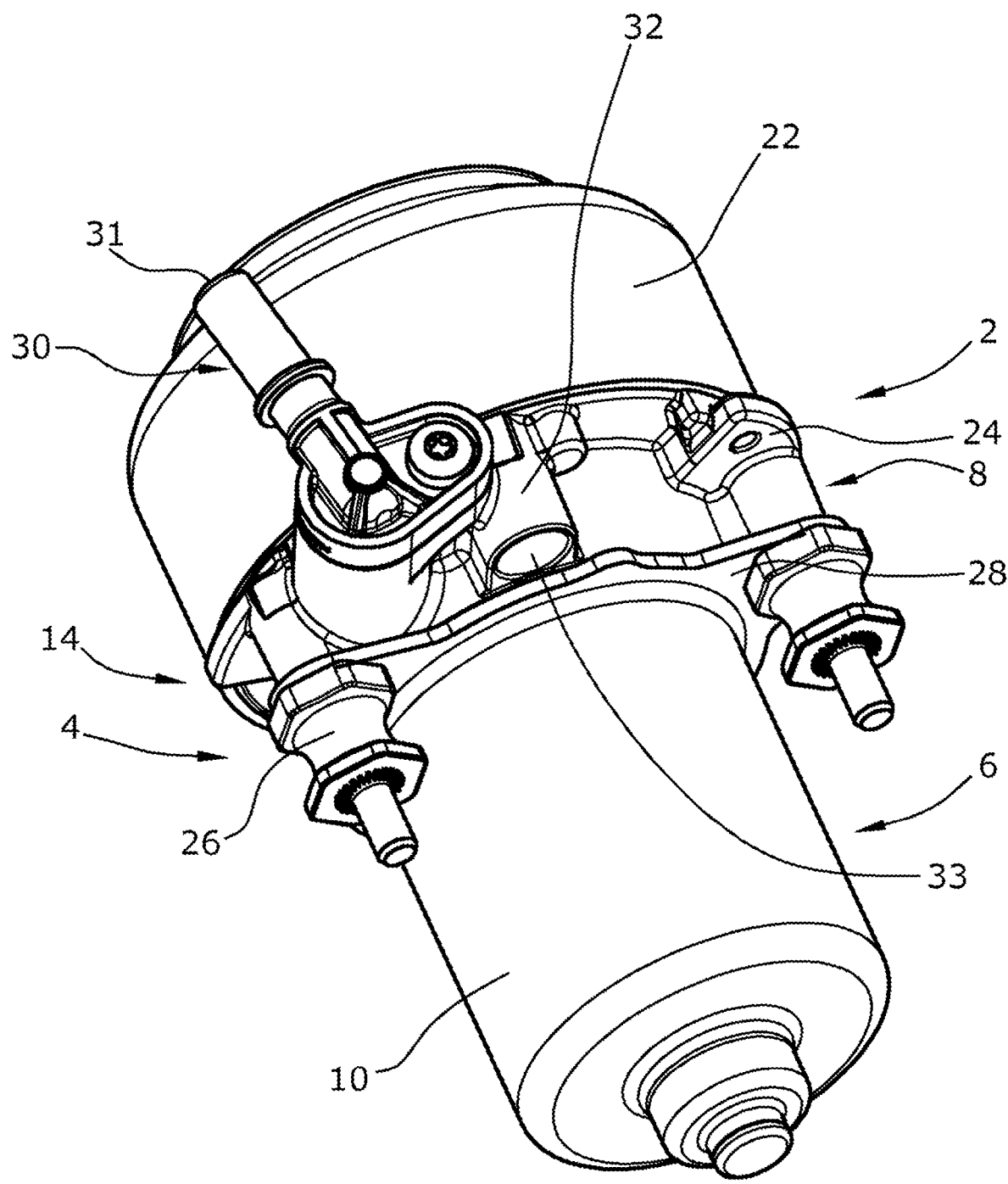
FIG. 1 shows a perspective view of an electrical motor vehicle vacuum pump arrangement according to the present invention.

The present invention provides that the outlet opening arrangement comprises an outlet channel that is closed relative to the drive motor and the pump unit, which outlet channel, when viewed in the direction of the outlet opening, has at least one abrupt change in cross-section which is designed as a sealing with an $A_2/A_1$ of $\geq 3$, where $A_2$ describes the cross-sectional area of a sub-region behind the change in cross-section, and $A_1$ describes the cross-sectional area of a sub-region before the change in cross-section. Such a simple measure considerably reduces the risk of intake of liquid or dirt particles. Such an arrangement can also easily be combined with other sound protection measures. It is here particularly advantageous when the sub-region of the outlet channel has a length of $L \geq 1.5 \times D_2$ behind the change in cross-section, where $D_2$ describes the diameter of the sub-region.

These sound protection measures can in particular be provided by the sound absorption element comprising at least two sound absorption chambers arranged in series, wherein the first sound absorption chamber is fluidically connected to the pump rotor chamber via a first connection arrangement and is fluidically connected to the second sound absorption chamber via a second connection arrangement, and wherein the second sound absorption chamber is fluidically connected to the outlet opening arrangement, wherein at least one sound absorption element is provided in the form of a channel arrangement for the second connection arrangement and/or the outlet channel.

In a embodiment of the present invention, the first sound absorption chamber can, for example, be integrated in the outlet-side end wall.

It can be advantageous if the first sound absorption chamber is provided by a cover element arranged on a side of the outlet-side end wall facing away from the pump rotor, wherein the second connection arrangement is configured as a groove in the outlet-side end wall.

In an embodiment of the present invention which is particularly installation-space-friendly, the housing assembly can, for example, comprise a closing cover element which grips around the outlet-side end wall so as to thereby form the second sound absorption chamber.

Because the outlet opening arrangement is provided in the form of successive channel elements in the outlet-side end wall, in the pump rotor housing part, and in the inlet-side end wall, existing housing parts can be used for the outlet opening and a considerable sound absorption is thus provided by the reflection properties of the channel arrangement. The abrupt change in cross-section is provided between the second and the third channel element in a particularly advantageous manner. An abrupt change in cross-section could alternatively also be produced when the abrupt change in cross-section is realized in the second channel element by a contact surface directed towards the second channel element and/or in the third element by a contact surface directed towards the third channel element.

The pump unit is advantageously arranged coaxially to the drive motor, wherein a rotor shaft of the drive rotor is supported in the inlet-side end wall via a bearing.

With regard to the installation space, it is additionally favorable when the inlet opening arrangement is provided in the inlet-side end wall.

All types of rotatory pump units are generally suitable. The pump unit can, for example, be a vane pump unit.

The present invention will be explained in detail below on the basis of the drawings.

Figure 2:
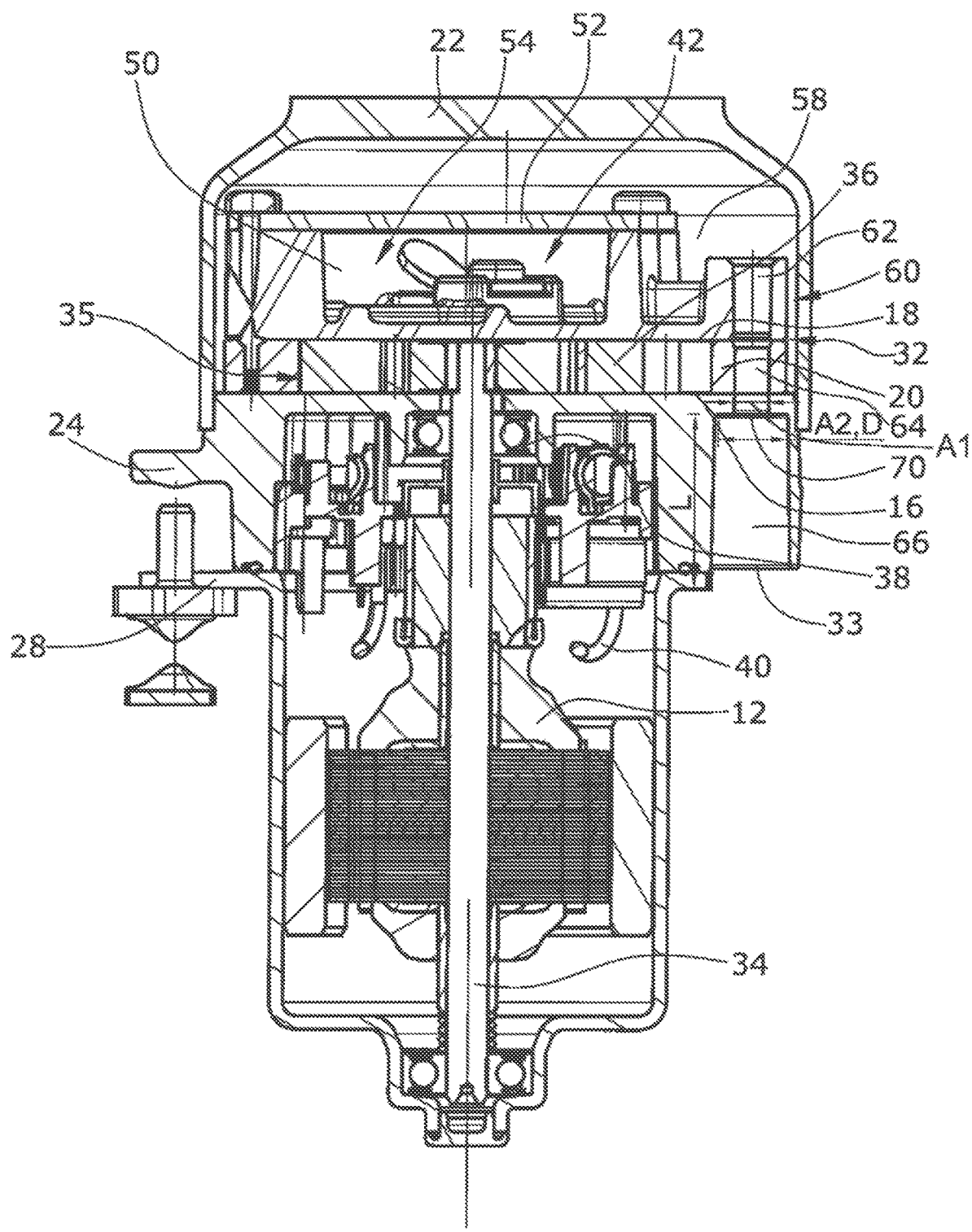
FIG. 2 shows a sectional view of a pump unit and part of the drive motor of the motor vehicle vacuum pump arrangement of FIG. 1.

FIGS. 1 and 2 illustrate an electrical motor vehicle vacuum pump arrangement 2 which serves to provide a vacuum, for example, having an absolute pressure of 100 mbar or less, in a motor vehicle. The vacuum is mainly utilized as a potential energy for actuating elements, for example, a pneumatic braking power booster or other pneumatic motor vehicle actuators. An electric drive for motor vehicle vacuum pumps is increasingly required since the internal combustion engine of the vehicle does not continuously run during vehicle operation.

The motor vehicle vacuum pump arrangement 2 is essentially composed of a housing assembly 4 which comprises a drive motor 6 and a pump unit 8. The drive motor 6 is here provided in a pot-shaped motor housing 10 and conventionally comprises a drive rotor 12 (see FIG. 2) and a drive motor stator (which is not illustrated in the drawings). The pump unit 8 comprises a pump rotor housing 14 composed of an inlet-side end wall 16, an outlet-side end wall, 18 and a pump rotor housing part 20 arranged therebetween (see in particular FIG. 2). The pump rotor housing 14 also has a closing cover element 22 which grips around the outlet-side end wall 18 and the pump rotor housing part 20 and which engages the inlet-side end wall 16 in a form-fit manner. The pump rotor housing 14 having the closing cover element 22 is connected to the pot-shaped motor housing 10 via a first flange part 24. The motor vehicle vacuum pump arrangement 2 can be connected to a vehicle body member of a motor vehicle with a damping body 26 being arranged therebetween, wherein the first flange part 24 is connected to a second flange part 28.

FIG. 1 also shows an inlet opening arrangement 30 in the form of a plastic tube element having an inlet opening 31, the tube element being provided in the inlet-side end wall 16 and conducting the air to be discharged from a motor vehicle actuator into the pump unit 8. Reference numeral 32 denotes the outlet opening arrangement 32 from which the air compressed by the pump unit 8 is discharged into the environment via an outlet opening 33.

FIG. 2 shows a sectional view of the pump unit 8 as well as part of the drive motor 6. As mentioned above, the drive motor 6 comprises a drive rotor 12 which is fastened to a drive rotor shaft 34 in a rotationally fixed manner, wherein the drive rotor shaft 34 also serves as a rotor shaft for a pump rotor 36 provided in a pump rotor chamber 35 of the pump rotor housing 14. The drive rotor shaft 34 is here supported in the inlet-side end wall 16 via a bearing 38 which is configured as a roller bearing.

Reference numeral 40 denotes an electric connecting cable 40 for the supply of power to the drive motor 6. The air taken in through the inlet opening 31 and the inlet opening arrangement 30 and compressed in the pump rotor chamber 35 by the pump rotor 36 configured as a vane rotor is ejected from the pump rotor chamber 35 via a first connection arrangement 42. Via this first connection arrangement 42, the compressed air travels into a first sound absorption chamber 50 which is integrated in the outlet-side end wall 18. The first sound absorption chamber 50 comprises a cover element 52 on the side of the outlet-side end wall 18 facing away from the pump rotor 36 for this purpose. The second connection arrangement 54 is realized through cover element 52 which is essentially configured as a groove in the outlet-side end wall 18. The compressed air damped in a first sound absorption chamber 50 is transferred to a second sound absorption chamber 58 via the second connection arrangement 54. The second sound absorption chamber 58 is essentially constituted by the closing cover element 22 gripping around the outlet-side end wall 18 in a fluid-tight manner. The compressed air is then discharged into the environment via the outlet opening arrangement 32 configured as a channel arrangement 60. The channel arrangement 60 is here made up of successive first, second and third channel elements 62, 64 and 66 and forms a closed outlet channel 68 which is not open relative to the drive motor 6 or the pump unit 8 or parts thereof. The first channel element 62 is provided in the outlet-side end wall 18, the second channel element 64 is provided in the pump rotor housing part 20, and the third channel element 66 is provided in the inlet-side end wall 16. Because the channel arrangement 60 thus constitutes an elongate outlet channel 68, an additional damping of the airborne sound can be achieved.

The present invention provides an abrupt change 70 in cross-section as a sealing, wherein $A_2$ describes the cross-sectional area of a sub-region, here configured as the third channel element 66, behind the abrupt change 70 in cross-section, and $A_1$ describes the cross-sectional area of a sub-region, here configured as the second channel element 64, before the abrupt change 70 in cross section. The third channel element 66 of the outlet channel 68 behind the abrupt change 70 in cross-section has a length L of $2.5 \times D_2$, where $D_2$ describes the diameter of the third channel element 66. The abrupt change 70 acts as a sealing which prevents the prevailing negative pressure from causing liquid and dirt particles to flow into the evacuated pump unit at the time of cutoff since the flow velocity and thus the negative pressure are smaller on the side of the abrupt change 70 in cross-section facing the outlet opening 33. In the present exemplary embodiment, the ratio of the cross-sectional areas $A_1/A_2$ is 4, i.e., selected as ≥3, so that the negative pressure is not sufficient for taking in particles.

The abrupt change in 70 cross-section in the third channel element 66 is here realized in a simple manner by molding.

Other changes in cross-section can of course also be additionally or alternatively realized.

The present invention is not limited to embodiments described herein; reference should be had to the appended claims.

What is claimed is:

1. An electrical motor vehicle vacuum pump arrangement comprising a housing assembly which comprises:
   an inlet opening arrangement comprising an inlet opening;
   an outlet opening arrangement comprising an outlet opening and an outlet channel;
   a pump unit comprising a pump rotor housing which comprises an inlet-side end wall, an outlet-side end wall, and a pump rotor housing part which is arranged between the inlet-side end wall and the outlet-side end wall, the pump rotor housing part being configured to enclose a pump rotor chamber in which a pump rotor is arranged;
   a drive motor comprising a motor rotor and a motor stator;
   at least one sound absorption element which is configured to provide for a noise reduction; and
   a sealing which is connected to the pump rotor chamber and which is directed towards the outlet opening,
   wherein,
   the outlet opening arrangement is connected to one of the at least one sound absorption element,
   the outlet channel of the outlet opening arrangement is closed relative to the drive motor and the pump unit,
   the outlet channel of the outlet opening arrangement, when viewed in a direction of the outlet opening, comprises at least one abrupt change in cross-section which is designed as the sealing with an $A_2/A_1$ of $\geq 3$, where $A_2$ is a cross-sectional area of a first sub-region behind the at least one abrupt change in cross-section, and $A_1$ is a cross-sectional area of a second sub-region before the at least one abrupt change in cross-section, and
   the outlet opening arrangement is provided as a channel arrangement which has a form of channel elements, the channel elements comprising a first channel element arranged in the outlet-side end wall, a second channel element arranged in the pump rotor housing part, and a third channel element arranged in the inlet-side end wall.

2. The electrical motor vehicle vacuum pump as recited in claim 1, wherein the first sub-region of the outlet channel has a length L of $L \geq 1.5 \times D_2$ behind the at least one abrupt change in cross-section, where $D_2$ is a diameter of the first sub-region.

3. The electrical motor vehicle vacuum pump arrangement as recited in claim 1, wherein,
   the at least one sound absorption element comprises at least two sound absorption chambers comprising a first sound absorption chamber and a second sound absorption chamber which are arranged in series,
   the first sound absorption chamber is fluidically connected to the pump rotor chamber via a first connection arrangement and is fluidically connected to the second sound absorption chamber via a second connection arrangement,
   the second sound absorption chamber is fluidically connected to the outlet opening arrangement, and
   at least one of the at least one sound absorption element is provided as a channel arrangement for at least one of the second connection arrangement and the outlet channel.

4. The electrical motor vehicle vacuum pump arrangement as recited in claim 3, wherein the first sound absorption chamber is integrated in the outlet-side end wall.

5. The electrical motor vehicle vacuum pump arrangement as recited in claim 3, wherein,
   the first sound absorption chamber is provided by a cover element which is arranged on a side of the outlet-side end wall facing away from the pump rotor, and
   the second connection arrangement is configured as a groove in the outlet-side end wall.

6. The electrical motor vehicle vacuum pump arrangement as recited in claim 3, wherein the housing assembly further comprises:
   a closing cover element which is configured to grip around the outlet-side end wall (18) so as to form the second sound absorption chamber.

7. The electrical motor vehicle vacuum pump arrangement as recited in claim 1, wherein the at least one abrupt change in cross-section is provided between the second channel element and the third channel element.

8. The electrical motor vehicle vacuum pump arrangement as recited in claim 7, wherein the at least one abrupt change in cross-section is provided in at least one of the second channel element via a first contact surface facing the second channel element and the third channel element via a second contact surface facing the third channel element.

9. The electrical motor vehicle vacuum pump arrangement as recited in claim 1, further comprising:
   a bearing,
   wherein,
   the drive motor comprises a rotor shaft; and
   the pump unit is arranged coaxially to the drive motor, and the rotor shaft of the drive rotor is supported in the inlet-side end wall by the bearing.

10. The electrical motor vehicle vacuum pump arrangement as recited in claim 1, wherein the inlet opening arrangement is provided in the inlet-side end wall.

11. The electrical motor vehicle vacuum pump arrangement as recited in claim 1, wherein the pump unit is a vane pump unit.

* * * * *